Figure 1:
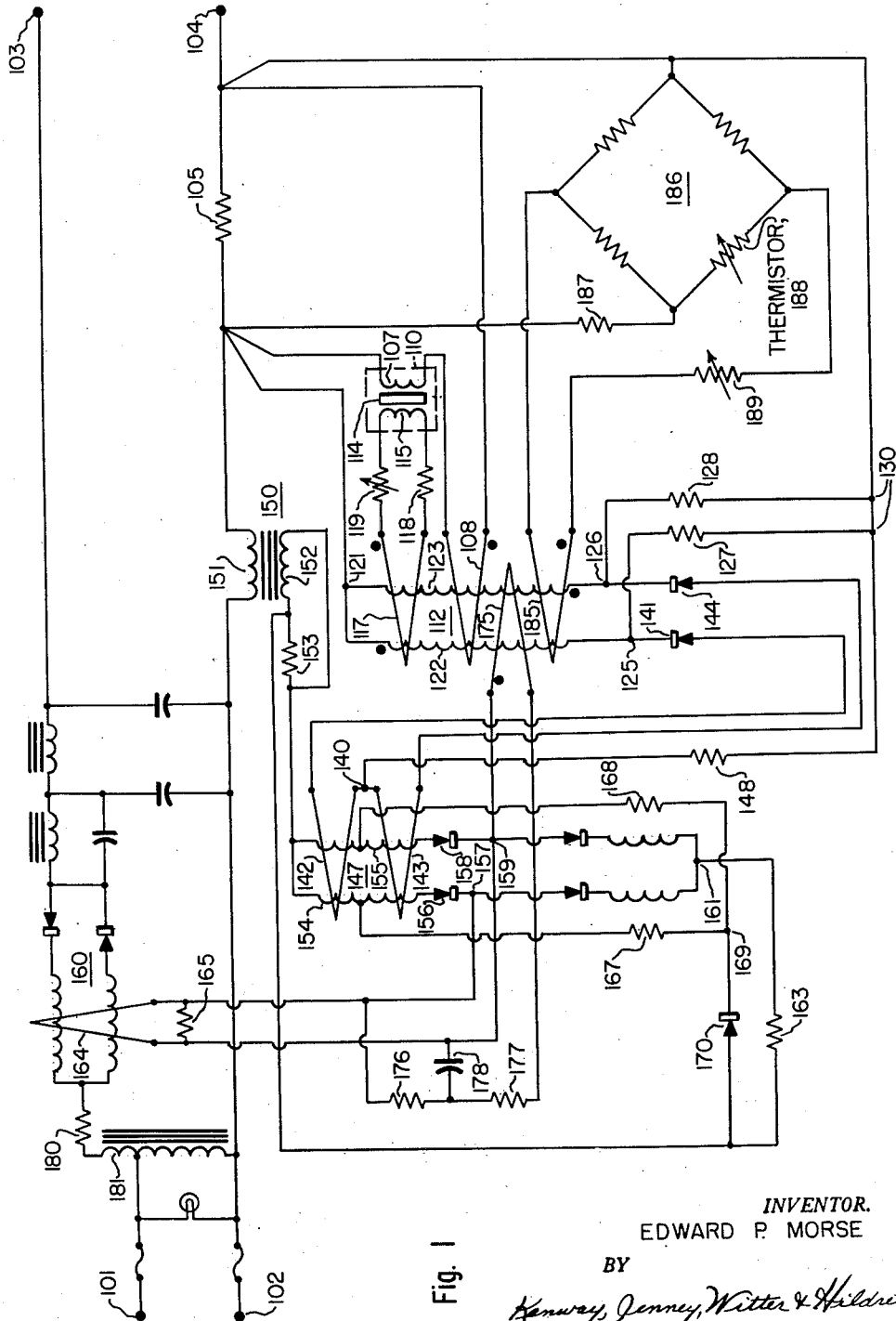

March 4, 1958 E. P. MORSE 2,825,866
ELECTROMAGNETIC REGULATOR
Filed July 1, 1955 2 Sheets-Sheet 1

INVENTOR.
EDWARD P. MORSE
BY
Kenway, Jenney, Witter & Hildreth
ATTORNEYS

March 4, 1958 E. P. MORSE 2,825,866
ELECTROMAGNETIC REGULATOR
Filed July 1, 1955 2 Sheets-Sheet 2

INVENTOR.
EDWARD P. MORSE
BY Kenway, Jenney, Witter & Hildreth
ATTORNEYS

United States Patent Office 2,825,866
Patented Mar. 4, 1958

2,825,866

ELECTROMAGNETIC REGULATOR

Edward Paul Morse, Norwood, Mass., assignor, by mesne assignments, to American Radiator & Standard Sanitary Corporation, New York, N. Y., a corporation of Delaware Application July 1, 1955, Serial No. 519,367

9 Claims. (Cl. 323—66)

My invention relates to electromagnetic regulator apparatus for stabilizing electrical quantities such as currents or voltages.

More particularly, my invention relates to electromagnetic regulator apparatus capable of supplying substantially constant electric current or voltage outputs despite fluctuations of voltage inputs thereto and despite changes of ambient temperature or of load conditions, or passage of time.

Still more particularly, my invention includes as a subcombination an electromagnetic reference device capable of serving as a standard of electrical quantities, against which other electrical quantities of like nature, derived from any source whatsoever, may be matched or compared, and thereby measured.

The problem of regulation and stabilization of electrical quantities is an area of the electrical art which has received a great deal of attention and which has spawned a great many inventions and technological developments. However, until this time, there has been no regulator for alternating electrical quantities which is sufficiently accurate, rugged, and immune to load and temperature variations to satisfy certain instrumentation requirements while at the same time being sufficiently inexpensive to permit utilization in high-sales-volume commercial apparatus. Furthermore, until this time, there has been no really satisfactory electrical standard for use in voltage and current comparisons in such apparatus where an appreciable load is placed upon the standard itself. Ruggedness and long-life requirements have brought saturable reactors and magnetic amplifiers into use for regulator duty, but until my invention there has been no such regulator standard characterized by a sufficient freedom from fluctuation of value, a sufficient insensitivity to temperature conditions, and sufficient load-carrying capacity.

Accordingly, it is an object of my invention to provide a regulator or constant-current source capable of delivering a current, or voltage, of adjustable magnitude but of a magnitude which, once established, will be maintained within very close tolerances despite changes in input quantities, changes in load, and changes in temperature.

It is a further object of my invention to provide a regulator or constant-current source of the nature described which is at the same time sufficiently rugged and long-lived for applications where maintenance will be very infrequent and sufficiently inexpensive to permit widespread commercial application.

It is a still further object of my invention to provide a regulator or constant-current source having satisfactory transient response and capable of producing an alternating wave form of minimum distortion.

It is still another object of my invention to provide a reference for electrical quantities, said reference being capable of diverse applications both in regulator and in other types of apparatus, and said reference being further characterized by substantial constancy of performance under varying load, temperature and time conditions, and the ability to serve as the basis for the making of diverse types of electrical measurements.

Briefly, these and other objects of my invention have been fulfilled by taking advantage of the properties of saturable reactors and magnetic amplifiers, and particularly the capability of a saturable transformer to transmit from its primary winding to its secondary winding a so-called constant volt-time integral during each half-cycle even though the voltage and time of voltage application to the primary winding may far exceed the level required in order to supply to the secondary the aforementioned constant volt-time integral. Since there is in effect thus produced in the secondary a standard volt-time integral during each half-cycle of transmission, I am able to measure the amount by which the available volt-time integral at the primary winding exceeds the volt-time integral transmitted to the secondary winding and to use this difference as an error signal which, following suitable shaping and amplification, is capable of correcting the electrical quantity to be regulated.

For additional objects and advantages, and for a better understanding of the way in which the above-referred-to error signal is generated and utilized in the apparatus of my invention, attention is now directed to the following detailed description and to the accompanying drawings. The features of my invention which are believed to be novel will be particularly pointed out in the appended claims.

Figures 2, 3, 4:
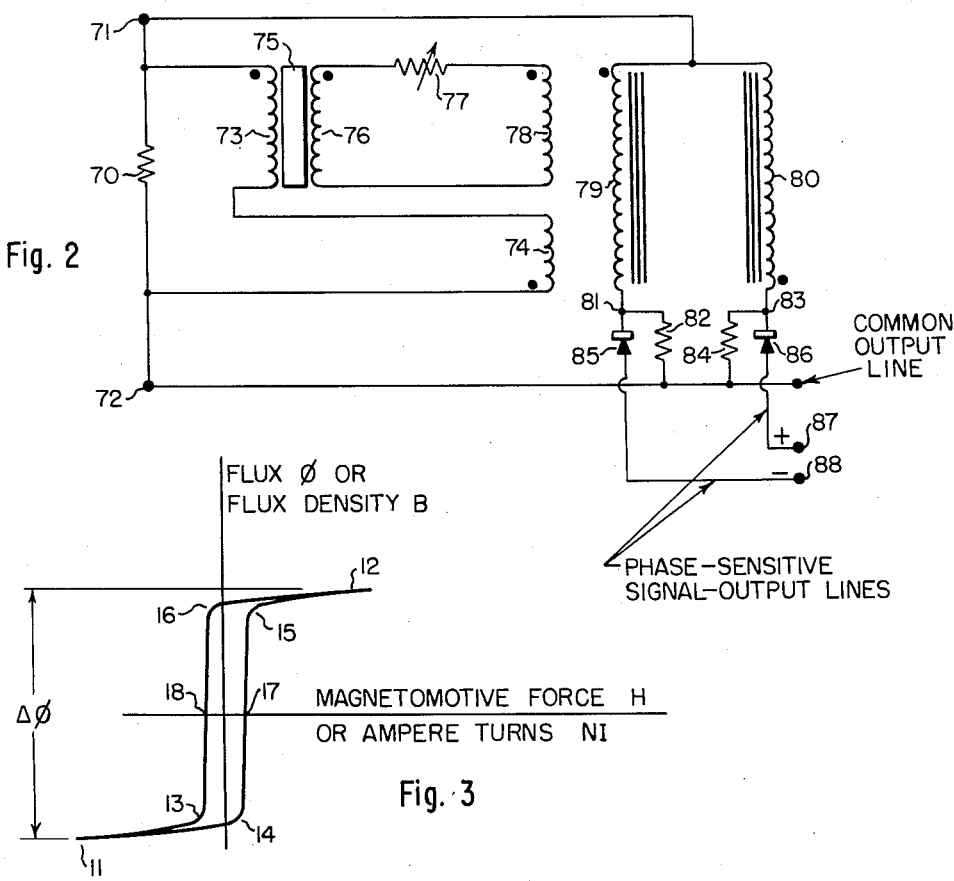

In the drawings:

Fig. 1 is a detailed schematic diagram of one form of the electromagnetic regulator and constant-current source of my invention, Fig. 2 is a detailed schematic diagram of an electrical-quantity reference which forms a subcombination of my abovementioned regulator but which has wide and diverse application, Fig. 3 is an approximate portrayal of the general magnetic characteristics of a core material suitable for use in a saturable transformer contained within the electrical-quantity reference of Fig. 2, and Fig. 4 is an approximate portrayal of primary voltages and load-winding voltages for the saturable transformer contained within the electrical-quantity reference of Fig. 2 and for different magnitudes of applied voltages.

There are many applications where a regulator or a voltage, current, or power supply is required where the environment or operating conditions are such that electronic apparatus containing fragile electron tubes is precluded. For instance, in some military applications or in some commercial applications such as isolated pipeline stations, the shock, vibration and temperature conditions may be so severe and the opportunities for maintenance so infrequent that electron-tube apparatus with its attendant relative unreliability and fragility cannot be employed. In such cases, the attempt has been made to employ magnetic amplifiers in place of the electron-tube amplifiers and sensing devices. However, there has been difficulty in obtaining satisfactory sources of reference quantities and in obtaining satisfactory accuracy and speed of response. I have found that these problems can be substantially solved by employing a novel reference device in which advantage is taken of the properties of a saturable transformer having a core of magnetic material substantially as shown in Fig. 3. This is a so-called "square-loop" or "rectangular-loop" material and will be represented, on the schematic diagram of Fig. 1, as a rectangle in order to emphasize the shape of its curve of magnetic flux density "B" as a function of magnetomotive force, or magnetomotive force per unit length "H." Materials which have a "rectangular" B-H curve include "Deltamax," "Orthonol," and a rectangular-loop material obtainable from Magnetics, Inc., of Butler, Pennsylvania. Inasmuch as any material having a relatively small coercive force and a B-H curve substantially of the form shown in Fig. 3 may be employed, the materials mentioned are to be taken as exemplary only, and not as a recitation of all suitable materials.

Referring to Fig. 3, it will be seen that, if flux density B (or total flux $\phi$ for any given saturable transformer) is plotted as a function of magnetomotive force per unit of core length H or of the ampere turns NI producing the flux in question, the change in flux $\Delta\phi$ between the respective levels 11 and 12 of core saturation in the two opposite senses is substantially fixed. Furthermore, it will be noted that, if the magnetomotive force H is increased to bring the core from point 17 to point 15 where saturation takes place, a further increase of magnetomotive force H to bring the material from point 15 to point 12 produces very little additional flux density B or flux $\phi$. A similar observation may be made that increasing the absolute magnitude of magnetomotive force in the opposite sense to bring the core material from point 18 to point 13 produces substantially saturation flux in the opposite direction, and further increase in absolute magnitude of magnetomotive force to bring the core material from point 13 to point 11 produces very little additional increase of flux in the core.

Now, it is well known that the voltage induced in the secondary winding of a transformer is substantially proportional to the rate of change of the magnetic flux in the core linking the secondary windings, according to the following relation:

$$E = N_2 \frac{d\phi}{dt} \qquad \text{Eq. 1}$$

where $N_2$ is a proportionality constant including the number of secondary turns. This expression may be written in the following form:

$$\int E\,dt = N_2 \int d\phi \qquad \text{Eq. 2}$$

Remembering that the preceding paragraphs have shown the integral of $d\phi$ taken between the limits of saturation in opposite senses to be substantially constant, regardless of the amount of magnetomotive force applied beyond the amount required to produce saturation, it will be seen that $\int E\,dt$ likewise must be substantially fixed. That is to say, if the total change of core flux produced by the entire excursion of primary current is limited to the amount $\Delta\phi$ as shown in Fig. 3, then no further voltage can be induced in the secondary winding beyond the time in each half-cycle when core saturation takes place. Hence, $\int E\,dt$ induced in the secondary winding receives substantially no contributions in each half-cycle after saturation takes place, and the value of the integral is fixed for each half-cycle, assuming only that the signal applied to the primary winding is sufficient to produce core saturation.

It has been shown in the preceding paragraph that, in each half-cycle during which saturation of the transformer core takes place, substantially no voltage is induced in the secondary winding after the instant of saturation and until a new half-cycle begins. It is also clear that, in each half-cycle during which saturation of the transformer core takes place, substantially no voltage is induced in the primary winding after the instant of saturation and until a new half-cycle begins. The latter statement is, of course, true because at the instant of saturation the differential permeability of the core falls nearly to zero and causes the self-inductance of the primary winding as well as the mutual inductance between primary and secondary windings to fall nearly to zero for the remainder of the half-cycle. Now, if a load winding is connected in series with the primary winding but on a different core, and a known voltage waveform is impressed across the series combination of the primary winding and the load winding, the load winding will of course have across it a voltage equal to the difference between the known voltage waveform and the instantaneous primary voltage. At the instant of core saturation when the primary voltage falls nearly to zero, the voltage across the load winding necessarily jumps sharply and for the remainder of the half-cycle represents substantially the same voltage as the impressed voltage of known waveform. Therefore, the instant when the voltage on the load winding suddenly increases is substantially the instant when core saturation takes place, and the size of the sudden increase is a measure of the time of saturation as well as of the voltage appearing across the primary winding at the instant just before saturation took place. I have found that this fact makes possible the measurement of voltage if the frequency of the applied wave is known or, on the other hand, makes possible the measurement of frequency if the amplitude and shape of the applied voltage wave are known.

The diagrams of Fig. 4 illustrate the performance of the saturable transformer which has been discussed in the paragraphs supra. In each diagram, voltage is plotted as a function of time for two half-cycles. In each case, the dotted sine wave is the voltage applied to the series combination of the transformer primary winding and the load winding (on another core). The pulses within the sine wave represent the voltage across the third, or load, winding. It will be noted that, as the amplitude of the voltage impressed across the series combination is increased, the instant during each half-cycle when saturation of the transformer core takes place occurs earlier and earlier. Furthermore, for each given transformer core, the volt-time integral under the sine wave preceding the instant of saturation during each half-cycle remains constant, as shown by the shaded areas which are equal in all cases. It will be seen that the actual magnitude, as well as the time of occurrence of the pulses in each half-cycle can be smoothly adjusted by changing the amplitude of the voltage wave applied to the series combination of the primary winding and the load winding. Still further, it may be assumed with only relatively small inaccuracy that the volt-time integral absorbed by the saturable-transformer core per half-cycle is given by the shaded area for each half-cycle in each diagram of Fig. 4. Inasmuch as the shaded area per half-cycle is constant, assuming only that core saturation is produced, I am able to employ this constant volt-time integral as a reference by supplying it to another circuit element, in which a comparison based thereon may be made. I prefer to employ a half-wave magnetic amplifier as this other circuit element because, if the above-described volt-time integral is supplied to one control winding of the magnetic amplifier, the magnetic amplifier is capable of "remembering" the volt-time integral during the remainder of each half-cycle and comparing it with a volt-time integral supplied to a second control winding of the magnetic amplifier during the latter part of the half-cycle. If desired, the volt-time integral supplied to the second control winding may be derived from the circuit of the transformer primary winding. By permitting the comparison between the reference volt-time integral derived from the transformer secondary winding during the early part of each half-cycle and an "unknown" volt-time integral derived from the transformer primary winding during the latter part of each half-cycle, a measure of the "unknown" volt-time integral is provided. This is true whether the "unknown" volt-time integral is derived from the primary circuit of the saturable transformer or from some other source, but the results of the comparison are especially useful if the "unknown" volt-time integral is derived from the circuit of the primary winding of the saturable transformer by connecting said primary winding in series with one of the control windings of the magnetic amplifier. In such a case, the "load" winding referred to in the paragraphs supra is identical with the second control winding of the magnetic amplifier. In summary, I have provided a combination of a saturable transformer and a magnetic amplifier which together constitute a measuring device useful in many applications because of the ability of the saturable transformer to produce a reference volt-time integral and the ability of the magnetic amplifier to "remember" the reference volt-time integral during the remainder of a half-cycle and to compare it with another volt-time integral. If the last-named volt-time integral happens to be drawn from a winding in series with the transformer primary winding, additional advantages accrue which will become apparent later in this specification.

Now that the function of the saturable transformer and magnetic amplifier has been explained, I shall proceed to explain the electromagnetic regulator of my invention, incorporating the saturable transformer and magnetic amplifier. It will be understood that much of the circuitry of the regulator is specified only for completeness and that many changes in configuration may be made without departing from the principles of my invention. In particular, magnitudes of components will be specified for a regulator designed to provide a constant output alternating current of 500 milliamperes with an input voltage varying between 95 and 135 volts, 60 cycles per second. The circuit is designed to accommodate an inductive and resistive load such as synchronous instrumentation and control equipment having an input impedance between 100 and 300 ohms.

Turning to Fig. 1, I have shown a pair of input terminals 101 and 102 to which an alternating-current supply voltage is connected, and a pair of output terminals 103 and 104 from which the desired constant alternating current (500 milliamperes, for example) is to be drawn. A resistor 105, which may have a value of 25 ohms, is connected as a sensing element in series with the output, and the control voltages are taken from across this resistor. One terminal of resistor 105 is connected through the series combination of a primary winding 107 and a control winding 108 to the other terminal of resistor 105, where primary winding 107 is part of a saturable transformer 110, and control winding 108 is applied to a magnetic-amplifier circuit 112. In addition to primary winding 107, saturable transformer 110 includes a saturable core 114 having a substantially rectangular B-H characteristic, and a secondary winding 115. Magnetic-amplifier circuit 112 includes, in addition to control winding 108, another control winding 117 which is connected in series with a resistor 118, a variable resistor 119, and secondary winding 115 of saturable transformer 110. Magnetic amplifier 112 is a push-pull, bridge-type half-wave magnetic amplifier, and for the sake of clarity of explanation, relative polarities of the various windings will be indicated by dots on Fig. 1 of the drawings. The use of such notation is permissible because the currents supplied to the magnetic amplifier can, with very little error, be assumed to tend to produce core fluxes either nearly in phase with one another or nearly 180 degrees out of phase with one another. In particular, the polarities of control windings 108 and 117 are such that they tend to produce fluxes which are respectively in phase opposition with each other. This fact is an important one because it is basically these two control windings (108 and 117) which make the comparison that is so important in the functioning of a regulator.

Inasmuch as magnetic amplifier 112 has been described supra as a bridge-type magnetic amplifier, it will now be explained wherein the bridge nature of the amplifier lies. If a terminal 121, connected to a first terminal of resistor 105, be considered to be one corner of the bridge, the two adjacent legs of the bridge comprise respectively the main windings 122 and 123 of the magnetic amplifier. Windings 122 and 123 are both connected to terminal 121 and, respectively, to terminals 125 and 126, which form the second and third corners of the bridge. Auxiliary members of the bridge comprise, respectively, a bias resistor 127 and a bias resistor 128 which are respectively connected to terminals 125 and 126 and which are both connected to a terminal 130. The bias resistors help to determine the conduction angles of the amplifier. In the suggested embodiment of regulator, bias resistors 127 and 128 may be of 20,000 ohms value. Terminal 130 is in turn conductively connected to a second terminal of resistor 105 to complete the circuit connected across resistor 105. In accordance with the dot convention, main windings 122 and 123 are shown to be of opposite polarity so that any signal applied through any one of the control windings will have opposite effect on the magnetic flux linking the two main windings. That is to say, any given signal will tend to increase the flux linking one main winding and either decrease the flux linking the other main winding or increase it in the opposite sense. This statement is, of course, subject to the qualification that any signal acting through a control winding will not produce a substantial change of flux in an already saturated core until the state of the core is brought back to the "knee" of the B-H curve where the differential permeability (or slope of the curve) again becomes appreciable.

Brief reference has already been made to the importance of the relative polarities of windings 108 and 117 and to the fact that operation of the regulator depends upon the state of phase opposition of these windings, as shown by the dots on Fig. 1. Turning again to the waveform diagrams of Fig. 4, various voltages across sensing resistor 105 may be represented respectively by dotted sine-wave curves 51, 52, 53, and 54 of diagrams (a), (b), (c), and (d). For a given magnetic amplifier, the corresponding voltage waveforms across control winding 108 may then be respectively represented by curves 61, 62, 63, and 64, which will be seen to take a sort of pulse form. As was pointed out in the earlier portions of the specification, the voltages across the primary winding of the saturable transformer are the differences between the respective known applied voltages and the respective load-winding voltages. That is to say, at any given instant, the voltage across control winding 108 is equal to the difference between the voltage taken from across sensing resistor 105 and the voltage across primary winding 107 of saturable transformer 110. The voltage taken from across resistor 105 has been referred to as a known voltage because it is proportional to output current, the stabilized quantity, and may be assumed to be an alternating wave of substantially uniform amplitude and sinusoidal waveform. The assumption of sinusoidal waveform is based upon the fact that between input terminals 101, 102 and output terminals 103, 104 are interposed low-pass filter elements later to be described, which suppress any high-frequency components in the regulator output and cause the output to be substantially sinusoidal at the fundamental frequency.

A study of the diagrams of Fig. 4 shows that, as the amplitude of the voltage wave across resistor 105 increases, the instant during each half-cycle when a substantial voltage appears across control winding 108 becomes earlier and earlier. In particular, the area under curves 51, 52, 53 and 54 during each half-cycle prior to the appearance of the voltage pulses across control winding 108 is shown to be constant and may be regarded as the constant volt-time integral required in order to produce saturation of core 114. The core 114 in effect evaluates this integral and permits a substantial signal to appear across control winding 108 as soon as the required integral has been attained. The volt-time integral may be regarded as a measure of the energy storage in the magnetic field of the transformer core and permits the associated circuit including control winding 117 to serve as a reference or standard by means of the integration which is produced in the core of magnetic amplifier 112. By adjusting the ratio between the respective numbers of turns in windings 107 and 115 of saturable transformer 110, or by adjustment of variable resistor 119 in the secondary circuit, the reference or standard may be established at any desired level, thereby permitting the integrated magnetic effect produced by control winding 108 to be balanced against any desired integrated reference magnetic effect produced by control winding 117.

Although core 114 of saturable transformer 110 evaluates the volt-time integral applied to it, the operation of the standard and the electromagnetic regulator of my invention depends also upon the volt-time integration performed by the core of magnetic amplifier 112. In various prior-art devices depending upon integration of some function over a period of time, an attempt has been made to obtain the integration by a process of rectification and filtering. However, such a process employs circuit elements which may be subject to drift and temperature sensitivity. By employing an alternating reference quantity and making possible the direct comparison between the alternating reference quantity and another alternating quantity, I am able directly to develop an error signal which may then be employed to correct the electrical quantity to be stabilized. The device of my invention makes the aforementioned comparison in magnetic amplifier 112. This magnetic amplifier is of the half-wave, bridge type and gives an output which is proportional to the net volt-time integral applied by the control windings during the non-conducting half-cycle, that is to say, the half-cycle during part of which the core in question is unsaturated and the main winding in question has relatively high inductance. In particular, magnetic amplifier 112 gives an output which is proportional to the difference between the reference volt-time integral supplied to winding 117 during the early portion of the non-conducting half-cycle and the "unknown" volt-time integral supplied to winding 108 during the latter portion of the non-conducting half-cycle. By giving windings 108 and 117 a turns ratio which is other than unity, a comparison may be effected between a signal supplied to one of those windings and a multiple of a signal supplied to the other of those windings. Further, if winding 108 is connected in series with primary winding 107 of saturable transformer 110, the signal supplied to winding 108 and the signal supplied to winding 117 will both be functions of core 114 of transformer 110, and a certain amount of temperature compensation will be obtained when the temperature of core 114 changes.

The output of magnetic amplifier 112 is taken between terminals 125 and 126, which are the terminals that were referred to respectively as the second and third corners of the bridge. A path is furnished for said output through a non-symmetrically conductive device 141 one terminal of which is connected to terminal 125 and the other terminal of which is connected through the series combination of a control winding 142, a control winding 143, and a second non-symmetrically conductive device 144 to terminal 126, said control windings 142 and 143 being parts of a half-wave magnetic amplifier 147 and also constituting respectively the third and fourth legs of the bridge circuit of magnetic amplifier 112. Inasmuch as non-symmetrically conductive devices 141 and 144 are both so poled as to favor conduction of current away from control windings 142 and 143 and toward terminals 125 and 126 respectively, clearly there will be negligible circulating current in the path outlined from terminal 125 to terminal 126. Instead, a return path to these respective terminals is provided by conductively coupling a terminal 140, between control windings 142 and 143, through a resistor 148 to terminal 130, where access to terminals 125 and 126 is provided respectively through bias resistors 127 and 128. Terminal 140 may be regarded as the fourth corner of the bridge circuit of magnetic amplifier 112. When the bridge circuit of magnetic amplifier 112 becomes unbalanced by reason of unlike conditions of its cores carrying respectively windings 122 and 123, a signal goes out which is received and carried by either control winding 142 or control winding 143, depending upon the polarity of the signal. It is important, of course, that non-symmetrically conductive devices 141 and 144 be matched and that the cores of magnetic amplifier 112 be matched.

It may be re-stated at this point that the output signal which goes from magnetic amplifier 112 to magnetic amplifier 147 is substantially proportional to the net volt-time integral applied by control windings 108 and 117 during the non-conducting portion of each half-cycle for each of main windings 122 and 123. Therefore, not only does a constant net volt-time integral applied by windings 108 and 117 per non-conducting half-cycle produce a constant output from magnetic amplifier 112, but if the effects of windings 108 and 117 are so balanced that they produce no net volt-time integral per non-conducting half-cycle, the bridge circuit of magnetic amplifier 112 can remain balanced and will produce substantially no output signal. Moreover, inasmuch as the output signal from magnetic amplifier 112 is phase sensitive (i. e. inasmuch as said output signal has a polarity which depends upon whether the effect of control winding 108 exceeds that of control winding 117 or vice versa), the requirements for a satisfactory generator of error signals are satisfied. The signal by which the output of magnetic amplifier 112 excites magnetic amplifier 147 is a measure of the difference between the voltage across resistor 105 and a standard voltage and, moreover, said signal is not ambiguous because its polarity depends upon which of these voltages is the greater. A feature which makes this performance still more remarkable is the fact that phase-sensitive operation is obtained without the use of a uni-polar reference voltage and without the drift disadvantages which the obtaining of such a reference voltage would entail. A further feature worth emphasis is the fact that the supply voltage for the main windings 122 and 123, of magnetic amplifier 112, is drawn from across resistor 105 just as are the voltages supplied to control windings 108 and 117. This further feature provides the advantage of a stabilized supply and insures proper phase relationship between the supply voltage and the control voltages.

As for suggested values of particular components, I have found that, for the regulator to produce 500 milliamperes output with maximum efficiency, a saturable transformer 110 having 2000 turns of number-33 wire both in its primary winding and in its secondary winding is satisfactory. Resistor 118 may have a value of 1000 ohms, as may variable resistor 119. If control winding 117 is given 200 turns, control winding 108 may well have 50 turns. Each of the main windings 122 and 123 of magnetic amplifier 112 may consist of 4000 turns of number-33 wire, and non-symmetrically conducting devices 141 and 144 may give best results if they are silicon diodes. If necessary, selenium rectifiers may be used but are not favored.

Magnetic amplifier 147 is a half-wave amplifier which simply functions to build up the signal applied thereto and to pass the amplified signal along to still another magnetic amplifier 160, in which the actual control action takes place. Magnetic amplifier 147 may take a variety of forms, but one satisfactory form will now be briefly described. Voltage for amplifier 147 is derived from a transformer 150 having its primary winding 151 in the main line between input terminal 102 and resistor 105, and having its secondary winding 152 connected across a load resistor 153. A first terminal of resistor 153 is connected to one end of a main magnetic-amplifier winding 154 and to one end of a main magnetic-amplifier winding 155, the point of connection being a first corner of a bridge network. Winding 154 is connected through a rectifier or other non-symmetrically conductive device 156 to a terminal 157, a second corner of the bridge. Winding 155 is similarly connected through a rectifier 158 to a terminal 159, a third corner of the bridge, and said second and third corners of the bridge are each respectively connected to a terminal 161, the fourth corner of the bridge, through a series combination of another rectifier and another main magnetic-amplifier winding. Terminal 161, the fourth corner of the bridge, is connected back through a protective resistor 163 to the second terminal of resistor 153.

The output of magnetic amplifier 147 is taken between terminals 157 and 159, respectively the second and third corners of the bridge, and is supplied to a control winding 164 of full-wave magnetic amplifier 160. Control winding 164 has connected across it a resistor 165 which serves to provide a leakage path for current which resets control winding 164 while at the same time maintaining the time constant sufficiently long to permit control action exerted by winding 164 to persist during more than a half-cycle. Resistor 165 might, for instance, be of 1000-ohm value. Any desired bias of main windings 154 and 155 may be provided through taps made respectively thereto at points intermediate their ends or at terminals 157 and 159 and respectively connected through resistors 167 and 168 to a terminal 169 which is in turn connected through a rectifier 170 to a terminal of the secondary winding 152 of transformer 150.

Some degree of degenerative integral-control feedback is provided for magnetic amplifier 112 by means of a feedback-control winding 175. The source of the feedback signal is control winding 164 of magnetic amplifier 160, which performs the actual current stabilization. A first terminal of control winding 164 is connected through a resistor 176 and a resistor 177 to a first terminal of winding 175, while a second terminal of control winding 164 is directly connected to terminal 159 and to a second terminal of winding 175. A capacitor 178 is connected from the junction of resistors 176 and 177 to terminal 159 in order to provide the integrating feature of the degenerative action. The dot on the diagram of Fig. 1 shows that the polarity of winding 175 is such as to produce changes opposing those produced in the cores by control winding 108, thereby stabilizing the action of the regulator and permitting operation at higher gains and correction speeds than would otherwise be possible without risking instability.

The actual stabilization of the output current takes place in magnetic amplifier 160, which comprises in parallel two series combinations of a reactor winding and a rectifier, each reactor winding being subject to control by control winding 164, and the rectifiers being poled in a full-wave arrangement. The reactor windings are supplied through a resistor 180 from an auto-transformer 181 which is in turn supplied from an input across terminals 101 and 102. If desired, fuses may be inserted in the supply lines, and an indicator lamp may be connected across the auto-transformer input. Because the output waveform from magnetic amplifier 160 is rich in harmonics, the output current should be passed through a low-pass filter in order to purify the waveform and substantially eliminate the harmonic components. Such a low-pass filter may comprise two L-section stages, where each stage consists of a series inductor and a shunt capacitor in a manner well known in the art. If desired, one or both of the inductors may be tuned by means of a capacitor or capacitors connected in parallel therewith. The output current from the low-pass filter passes through primary winding 151 of transformer 150 and through resistor 105 to output terminals 103 and 104. It will be seen that the assumption of a reasonably stable current through resistor 105 was justified.

The degenerative-feedback stabilizing action of control winding 175 has been explained. There is still another control winding 185 on magnetic amplifier 112 which has a function yet to be explained. Control winding 185 is a temperature-compensation winding which has an input taken from across two opposite terminals of a bridge circuit 186, one leg of which incorporates a temperature-sensitive resistor 188 such as a thermistor which may be installed near core 114 of transformer 110. The remaining two terminals of the bridge circuit 186 are supplied with power from lines connected across resistor 105 in series with another resistor 187 which serves a protective purpose. A variable resistor 189 is connected between control winding 185 and bridge circuit 186 in order to permit adjustment of the temperature compensation. When a temperature change occurs in core 114 of saturable transformer 110, thus slightly affecting the reference volt-time integral transmitted to secondary winding 115 and to control winding 117 and also affecting indirectly the volt-time integral which reaches control winding 108 per half-cycle, there would, if there were no compensation, be an upset in the balance between the effects in magnetic amplifier 112 of control windings 108 and 117. However, by employing a temperature-compensation control winding 185 so poled as to oppose any changes in effect produced in the core of magnetic amplifier 112 per half-cycle by control winding 117, I am able substantially to eliminate any serious effects of temperature change in the core of the saturable transformer.

Another possible configuration of the regulator of my invention provides for control winding 108, instead of being connected in series with winding 107 across resistor 105, to be connected directly in series with the output load. In such a case, of course, fewer turns will be required for winding 108 than in the configuration of Fig. 1, but I have found that such a regulator is considerably more sensitive to temperature than is the configuration of Fig. 1. The reason for such temperature sensitivity may have been the uncompensated dependence of the core and copper loss of saturable transformer 110 upon ambient temperature. At any rate, the compensation inherent in the configuration of Fig. 1 reduces the temperature sensitivity almost to the vanishing point. In the compensation circuit, resistor 187 may have a value of 1500 ohms, the bridge resistors may have a value of 1000 ohms, and variable resistor 189 may have an available resistance of 2500 ohms.

Fig. 2 shows, by itself, the standard and comparison circuit which has already been discussed in connection with Fig. 1 but which may have separate utility in a great number of diverse applications. Such diverse applications are possible because the standard and comparison circuit is characterized by good stability and high sensitivity, because it is relatively simple as compared with devices employing rectifiers and requiring conversion of alternating quantities to D.-C. quantities for comparison, and because it provides for adjustment such as to permit cancellation at any desired balance point between the standard signal and the signal to be measured. Further, the standard and comparison circuit is capable, even without depending upon A.-C. to D.-C. conversion, of providing an error-signal output which is phase sensitive and which has a polarity corresponding to that of the error. Still further, as has been pointed out, the magnetic amplifier of the comparison circuit provides a means for "remembering" a reference volt-time integral supplied thereto during the early portion of a half-cycle and for comparing it with any desired volt-time integral supplied thereto during the latter portion of a half-cycle, thereby producing an "error" signal which is indicative of the signal to be measured. Such a characteristic renders the standard and comparison circuit suitable for use in recording instruments and numerous other control applications. In this connection, it may be pointed out that, since the saturable transformer provides a standard volt-time integral, there may be occasions when the amplitude of the voltage is accurately known but the frequency of the wave is changing and is to be measured. The standard and comparison circuit according to my invention provides a means for so doing.

In order to show clearly the basic elements of the standard and comparison circuit alone, brief reference to the components set forth in Fig. 2 will now be made. If the voltage to be measured or controlled is taken across a resistor or other impedance 70 through which a current is flowing between two terminals 71 and 72, said voltage may be applied to the series combination of a winding 73 and a winding 74, where winding 73 is the primary winding of a saturable transformer and where winding 74 is a control winding of a magnetic amplifier. The saturable transformer should have, as previously explained, a core of substantially "rectangular-loop" magnetic material and a secondary winding 76, where the relative polarities are as shown by the dots on the diagram. Secondary winding 76 is in turn connected through the series combination of a variable resistor 77 and a winding 78, where winding 78 is another control winding of the magnetic amplifier. Control windings 74 and 78 exert an influence, through the magnetic core of the magnetic amplifier, upon the currents flowing respectively in main windings 79 and 80 of the magnetic amplifier. As has been explained and as shown by the dots on the diagram, the relative polarities of main windings 79 and 80 are such that any finite net effect produced in the magnetic amplifier cores by control windings 74 and 78 will serve to unbalance the bridge circuit of which main windings 79 and 80 constitute two legs. A first end of main winding 79 is conductively connected to a first end of main winding 80 and to terminal 71, while a second end of main winding 79 is connected at a terminal 81 to a bias resistor 82, and a second end of main winding 80 is connected at a terminal 83 to a bias resistor 84. Resistors 82 and 84 are joined together at their ends remote respectively from terminals 81 and 83 and are connected in turn to terminal 72. Terminals 81 and 83 are respectively connected through non-symmetrically conductive devices 85 and 86 to the output-circuit terminals 87 and 88. If the stage to which the output signal is fed happens to be another magnetic amplifier or other push-pull device, it may be found desirable to connect one control winding thereof between terminal 87 and the common output line and another control winding thereof between terminal 88 and the common output line. It will be understood that the common output line is connected to terminal 72 of the main line. If the output signal is fed to another magnetic amplifier having two control windings one of which is connected between terminals 72 and 87 while the other is connected between terminals 72 and 88, then one of those control windings together with rectifier 85 may be considered to constitute a third leg of the bridge, while the other of those control windings together with rectifier 86 may be considered to constitute a fourth leg of the bridge. The output may, of course, be taken directly between terminals 87 and 88 if a phase-sensitive push-pull output signal is not required.

The specific embodiments which are shown in the drawings and which have been described in the paragraphs supra were chosen to illustrate the principles of my invention. As is well known to those skilled in the art, the array, disposition, number and character of the elements may be varied to meet particular operating or environmental requirements without departing from the essence of my invention.

Having thus disclosed my invention, what I claim as new and desire to secure by Letters Patent of the United States is:

1. An electromagnetic regulator for an electrical quantity comprising pickoff means for sensing said electrical quantity, saturable-core electromagnetic means, and amplifier means having a plurality of control windings, said saturable-core electromagnetic means having an input winding connected in series with a first one of said control windings of said amplifier means, said series combination being in turn responsive to said electrical quantity, means connecting said saturable-core electromagnetic means to a second one of said control windings of said amplifier means to provide a predetermined volt-time-integral signal thereto, and said first and second control windings of said amplifier means being connected in phase opposition.

2. An electromagnetic regulator for an electrical quantity comprising pickoff means for sensing said electrical quantity, saturable-core electromagnetic means and amplifier means responsive to said electrical quantity, said amplifier means being additionally responsive to a predetermined volt-time-integral output of said saturable-core electromagnetic means, and control means responsive to the output of said amplifier means for correcting said electrical quantity to a desired level.

3. In combination, means for sensing an electrical quantity, saturable-core electromagnetic means responsive to said electrical quantity for producing a predetermined volt-time-integral output, magnetic amplifier means responsive to said electrical quantity and to said predetermined volt-time-integral output, and control means responsive to the output of said magnetic amplifier means for correcting said electrical quantity to a desired level.

4. In combination, means for sensing an electrical quantity, saturable-core electromagnetic means responsive to said electrical quantity for producing a predetermined volt-time-integral output, magnetic amplifier means responsive to said electrical quantity for measuring the difference between a time integral of a portion of said quantity and said predetermined volt-time-integral output, and control means responsive to a version of said difference for correcting said electrical quantity to a desired level.

5. An electromagnetic regulator for an electrical quantity comprising means for sensing said electrical quantity, a saturable transformer and a plurality of magnetic amplifiers, means connecting said saturable transformer to a first one of said magnetic amplifiers, said saturable transformer and said first one of said magnetic amplifiers being responsive in one sense to portions of a time-integrated version of said electrical quantity, said first one of said magnetic amplifiers being further responsive in an opposite sense to a predetermined time-integrated version of said electrical quantity, a second one of said magnetic amplifiers being responsive to a version of the integrated output signal of said first one of said magnetic amplifiers, said second one of said magnetic amplifiers being connected in the line where said electrical quantity is present and being adapted to stabilize said electrical quantity.

6. An electromagnetic regulator comprising a control magnetic amplifier to which an input voltage is supplied, filter means for improving the waveform of the output of said control magnetic amplifier, means for sensing an electrical quantity characterizing said output of said control magnetic amplifier, saturable-transformer means and a first bridge-type magnetic amplifier connected to said sensing means and responsive to said electrical quantity, said bridge-type magnetic amplifier being also responsive to a predetermined volt-time-integral output of said saturable-transformer means, and a second bridge-type magnetic amplifier connected to and responsive to the output of said first bridge-type magnetic amplifier and means connecting said second bridge-type magnetic amplifier to said control magnetic amplifier, the output of said second bridge-type magnetic amplifier being applied to a control winding of said control magnetic amplifier to effect stabilization of said input voltage.

7. An electromagnetic regulator according to claim 6 in which said first bridge-type magnetic amplifier is fitted with a temperature-compensation control winding, the excitation for said temperature-compensation control winding being derived from a temperature-sensitive bridge circuit responsive to the core temperature of said saturable-transformer means.

8. An electromagnetic regulator according to claim 6 in which said first bridge-type magnetic amplifier is fitted with a degenerative-feedback control winding, the excitation for said degenerative-feedback control winding being derived from the output of said second bridge-type magnetic amplifier.

9. In combination, saturable-core transformer means having a primary winding and a secondary winding, and magnetic-amplifier means having at least a first control winding and a second control winding, said first control winding being connected to said secondary winding and responsive to a reference volt-time-integral signal derived therefrom, and said second control winding being connected in phase opposition to said first control winding and responsive to a signal to be measured.

References Cited in the file of this patent

UNITED STATES PATENTS 2,723,372    Eagan et al. ------------- Nov. 8, 1955